United States Patent [19]

Akao et al.

[11] Patent Number: 4,828,106

[45] Date of Patent: May 9, 1989

[54] PACKAGING CASE FOR PHOTOSENSITIVE SHEET FILMS

[75] Inventors: Mutsuo Akao; Kenji Tajima, both of Kanagawa, Japan

[73] Assignee: Fuji Photo Film Co., Ltd., Minami-Ashigara, Japan

[21] Appl. No.: 66,528

[22] Filed: Jun. 26, 1987

[30] Foreign Application Priority Data

Jun. 27, 1986 [JP] Japan ............................... 61-149387

[51] Int. Cl.[4] ....................... B65D 65/40; G03C 3/00; C08K 3/04

[52] U.S. Cl. ............................... 206/316.1; 206/455; 206/524.2; 428/35.7; 428/36.92; 428/507; 428/508; 428/509; 523/136

[58] Field of Search ..................... 206/524.2, 455, 316; 524/528, 496; 428/35, 207, 209, 211, 214, 215, 218, 220, 240, 283, 339, 340, 461, 507, 508, 509, 513, 516; 523/136

[56] References Cited

U.S. PATENT DOCUMENTS 4,147,291 4/1979 Akao et al. .
4,258,848 3/1981 Akao et al. .
4,331,725 5/1982 Akao .
4,337,285 6/1982 Akao et al. .
4,356,224 10/1982 Akao et al. .
4,359,499 11/1982 Akao et al. .
4,386,124 5/1983 Akao .
4,411,943 10/1983 Akao .
4,411,945 10/1983 Akao et al. .
4,436,809 3/1984 Akao et al. .
4,452,846 6/1984 Akao .
4,469,741 9/1984 Akao .
4,513,050 4/1985 Akao .
4,565,733 1/1986 Akao .
4,565,743 1/1986 Akao .
4,576,865 3/1986 Akao .
4,579,781 1/1986 Akao .
4,584,234 4/1986 Hirose et al. .
4,587,175 5/1986 Akao .
4,629,640 12/1986 Akao .
4,639,386 1/1987 Akao .
4,653,640 3/1987 Akao .
4,661,395 4/1987 Akao .
4,661,401 4/1987 Akao .
4,663,218 5/1987 Akao .
4,687,692 8/1987 Akao .

FOREIGN PATENT DOCUMENTS 56-7931 1/1981 Japan .
61-4911 2/1986 Japan .
61-4912 2/1986 Japan .
61-4913 2/1986 Japan .

*Primary Examiner*—Herbert J. Lilling
*Attorney, Agent, or Firm*—Burns, Doane, Swecker & Mathis

[57] ABSTRACT

In a packaging case for photosensitive sheet film comprising a light-shielding tray which receives a stack of said photosensitive sheet films and a light-shielding flexible cover sheet which is stuck in peelable state to seal the opening for taking out said stack, the improvement comprising that said tray is made of resin comprising 50 to 90 wt. % of a propylene-α-olefin copolymer resin having a melt index of higher than 18 g/10 minutes, a bending elastic modulus of more than 9,000 kg/cm$^2$ and a notched Izod impact strength of more than 2.0 kg cm/cm at 23° C., 0.2 to 5.0 wt. % of carbon black and 9.8 to 49.8 wt. % of linear low density polyethylene resin.

In the light-shielding tray of the invention, rigidity is secured by the propylene-α-olefin copolymer resin, and troubles caused by this copolymer resin such as mold shrinkage, warp and twist of the product are overcome and remarkable lowering of physical strength by blending carbon black are attained by incorporating the L-LDPE resin. Accordingly, even when this tray is made thin, sufficient rigidity and physical strength can be secured, although the tray is large. Since the deformation is small sealability between the light-shielding flexible cover sheet is acceptable. Moldability of the resin composing the tray is also sufficient.

6 Claims, 1 Drawing Sheet

PACKAGING CASE FOR PHOTOSENSITIVE SHEET FILMS

BACKGROUND OF THE INVENTION

1. Field of the Invention

This invention relates to a packaging case for the photosensitive sheet films sensitive to radioactive rays such as X-ray photographic films capable of loading them in an image recorder such as an image output laser printer in a light room.

2. Description of Prior Art

Recently, a radioscopic image recording and regenerative system has been developed. This system uses an accumulative (stimulation type) fluorescent material to obtain a radioscopic image of the subject, such as the human body, and it is utilized for diagnosis by doctors, etc.

In this system, radioscopic image information from the human body or the like is recorded in an accumulative fluorescent material sheet, and the stimulated fluorescent material obtained from the accumulative fluorescent material sheet is photoelectrically read to obtain an image signal. This image signal is outputted on a recording material like photographic photosensitive material as a visible image. The image output laser printer is used as the recorder for this system. In this printer, X-ray photographic film as the recording material is loaded through a magazine, and the film is taken out one sheet by one sheet by a sheet feeder using a sucker or the like. A laser beam is irradiated on the X-ray photographic film in accordance with the electric signal obtained from the accumulative fluorescent material sheet, and the object image is recorded. The X-ray photographic film is loaded in the printer in a light room so as not to be exposed to outside light.

Heretofore, various methods capable of loading in light room have been disclosed, for example, in Japanese Utility Model KOKAI No. 56-7931 and Japanese Utility Model KOKOKU Nos. 61-4911, 61-4912 and 61-4913, however these methods are complicated. On the other hand, the present inventor have made a packaging case for photosensitive sheet films shown in FIGS. 1 to 3.

FIG. 1 is a plan view of an embodiment of the tray which is the above packaging case body. FIG. 2 is a side view and FIG. 3 is a rear view thereof. As shown in the drawings, the light-shielding tray 1 is in box shape of which the upper side is opened to form a film taking out opening 4, and the bottom 2 and side walls 3*a*, 3*b*, 3*c* and 3*d* are formed intergrally. Ribs 5*a*, 5*b*, 5*c*, 5*d* and 5*e* are formed on the reverse side of the bottom 2 in parallel. Flange 7*a*, 7*b*, 7*c*, 7*d* is formed around the upper edge of the side walls 3*a*, 3b 3*c*, 3*d*, and the end of the flange is turned down. Ribs 10 are suitably provided on the reverse side of the flange. The front portion 7*a* of the flange is made wide, and a hole 8 to form grip 9 is opened at its center. In addition, a pair of engaging projections 6,6 is formed at the upper edge of the rear side wall 3*c* in the inside direction. The engaging projections 6,6 are provided in order to maintain photosensitive sheet films placed in the tray 1 in position. The size of this tray is approximately 40 c ×3 cm×5cm.

A light-shielding flexible cover sheet (not illustrated) is stuck on the flange through a heat seal layer or an adhesive in peelable state, and thereby the film taking out opening 4 is sealed in a light-shielding state.

Such a packaging case has first been disclosed by the inventor, and the tray has various properties such as complete light-shielding, sufficient physical strength necessary not to generate cracks which causes fogging of photosensitive sheet films, and good sealability to the light-shielding flexible cover sheet. General materials used for various container such as ordinary polypropylene cannot satisfy these requirements.

SUMMARY OF THE INVENTION

An object of the invention is to provide a tray for the packaging case for photosensitive sheet films which has complete light-shielding and sufficient physical strength necessary not to generate cracks in addition to sufficient rigidity.

Another object of the invention is to provide a tray for the packaging case for photosensitive sheet films which has good sealability to the light-shielding flexible cover sheet.

Such objects can be achieved by the tray formed by a particular material. Thus, the present invention provides, in a packaging case for photosensitive sheet films comprising a light-shielding tray which receives a stack of said photosensitive sheet films and a light-shielding flexible cover sheet which is stuck in peelable state to seal the opening for taking out said stack, the improvement comprising that said tray is made of resin comprising 50 to 90 wt. % of a propylene-$\alpha$-olefin copolymer resin having a melt index (JIS K-7210 at 230° C.) of higher than 18 g/10 minutes, a bending elastic modulus (JIS K-7203) of more than 9,000 kg/cm$^2$ and a notched Izod impact strength (JIS K-7110) of more than 2.0 kg cm/cm at 23° C., 0.2 to 5.0 wt. % of carbon black and 9.8 to 49.8 wt. % of linear low density polyethylene resin.

DETAILED DESCRIPTION OF THE INVENTION

Figure 1:
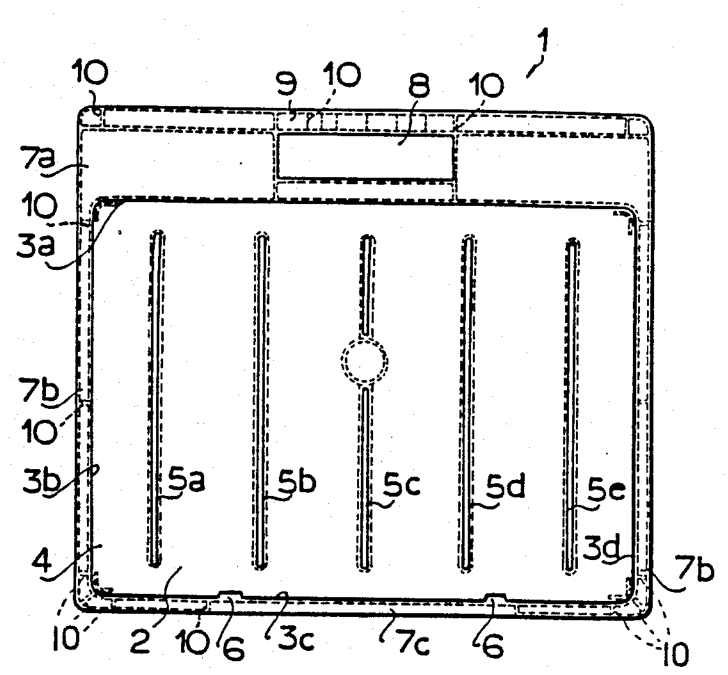
FIG. 1 is a plan view of an embodiment of the tray which is the body of the packaging case of the invention.
Figure 2:
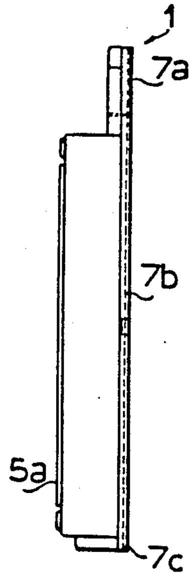
FIG. 2 is a side view thereof.
Figure 3:
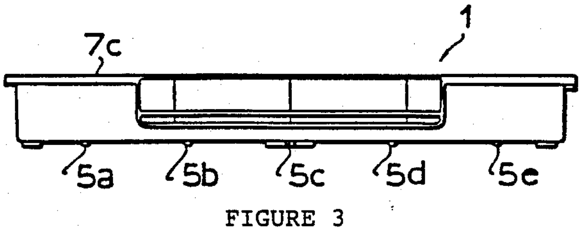
FIG. 3 is a rear view thereof.

The propylene-$\alpha$-olefin copolymer resin is preferably random type, and as the $\alpha$-olefin, ethylene is the most preferable. The light-shielding tray formed of this propylene-ethylene random copolymer resin blended with carbon black is hardly broken or whitened by dropping or impact. Additionally, the appearance of this tray is beautiful. The content of the $\alpha$-olefin is preferably 0.1 to 10 wt. %, and 2–5 wt. % is particularly preferable. When the content of the $\alpha$-olefin is less than 0.1 wt. %, the impact strength of the copolymer resin becomes insufficient. The impact strength also becomes extremely lower by blending carbon black. Moreover, in the case that the tray alone is dropped from 50 cm height, it is broken. Accordingly, this tray is impractical. On the other hand, when the content of the $\alpha$-olefin is beyond 10 wt. %, the rigidity becomes insufficient. Thereby, the tray is liable to twist to cause breakage or separation of the light-shielding flexible cover sheet.

A nucleating agent such as 1, 3, 2, 4-dibenzylidenesorbitol is preferably blended into the copolymer resin, because rigidity and Izod impact strength are improved. A suitable content of the nucleating agent is 0.1 to 2.0 wt. %.

The content of the copolymer resin in the resin composing the tray is 50 to 90 wt. %. When the content is less than 50 wt. %, the rigidity becomes insufficient. While, when the content is beyond 90 wt. %, in the case that α-olefin content is little, the dropping strength becomes insufficient. In the case that the α-olefin content is increased in order to secure dropping strength, the rigidity becomes insufficient to the contrary.

The melt index (MI, JIS K-7210 at 230° C.) is higher than 18 g/10 minutes. Since the projected area of the tray is large, and its thickness is thin (mean thickness is usually thinner than 3 mm), carbon black is blended. When the MI of the resin is lower than 18 g/10 minutes, injection pressure becomes too high. Moreover, the molded product is strained to generate warp or twist.

The bending elastic modulus is more than 9000 kg/cm$^2$. In the case that this coefficient is less than 9000 kg/cm$^2$, the rigidity becomes low. If the thickness is increased in order to prevent deformation, the cooling time after molding becomes lengthy, and stringiness is liable to occur. Moreover, the resin amount increases, and the cost is raised.

The notched Izod impact strength is greater than 2.0 kg cm/cm at 23° C. When this coefficient is less than 2.0 kg cm/cm at 23° C., the dropping strength becomes insufficient to prevent generate breakage or cracks in the tray.

Carbon blacks are divided into gas black, oil furnace black, anthracene black, acetylene black, lamp black, vegetable black, and animal black according to their origin. Among these, oil furnace carbon black is preferable in terms of light-shielding character, cost and improvement of properties. On the other hand, since acetylene black and Ketschen carbon black have antistatic characteristics, they are also preferable, though they are expensive. They may be blended to the oil furnace black in order to improve its character. A suitable pH of the carbon black is 5 to 9, particularly 6 to 9, and a suitable mean particle size is 10 to 50 mμ. Particularly, the oil furnace carbon black having a pH of 6 to 9 and a mean particle size of 15 to 30 mμ is preferable. By using the carbon black of such pH and particle size, a packaging material having the following merits is obtained. That is, the occurrence of fogging is rare, an increase or decrease of photosensitivity scarcely happens, light-shielding ability is large, and lumps of carbon black and pinholes such as fish eyes hardly are generated. Since the resin composing the tray contains linear low density polyethylene resin, the physical strength of this resin is raised by blending carbon black.

The content of carbon black is 0.2 to 5.0 wt. %. When the content is less than 0.2 wt. %, light-shielding ability becomes insufficient. While, when the content is beyond 5.0 wt. %, the resin becomes fragile and physical strength is insufficient.

Various blending methods of carbon black are known, however, the masterbatch method is preferable in points of cost and clear process. Various masterbatch methods are known, and any known method may be employed. Such a masterbatch method includes the method of dispersing carbon black into a polymer organic solvent solution to produce a masterbatch (Japanese Patent KOKOKU No. 40-26196) and the method of dispersing carbon black into polyethylene to produce a masterbatch (Japanese Patent KOKOKU No. 43-10362).

The linear low density polyethylene (L-LDPE) is a copolymer of ethylene and α-olefin, and it has a linear structure having short branches. The carbon number of the α-olefin is 3–13, and preferable α-olefins are butene-1, 4-methylpentene-1, hexene-1, heptene-1 and octene-1. In such a resin using any of these preferred α-olefins, physical strength is raised without a significant decrease in rigidity and heat resistance by blending with the carbon black. Mold shrinkage and warp are small. Accordingly, even though the thickness of the tray is made thin, various properties necessary as the package for photosensitive sheet films can be secured. Suitable ethylene content of L-LDPE is 85–99.5 mol. %, i.e. α-olefin content is 0.5–15 mol. %. Melt index (M.I., at 190° C.) is preferably 5–30 g/10 minutes (ASTM D-1238). Such a L-LDPE resin has low or medium density, and it is manufactured by vapor phase or liquid phase low- or medium-pressure method or modified high-pressure method. Examples of L-LDPE resin are "UNIPOLE" and "TUFLIN" (trade names, UCC), "DOWLEX" (trade name, Dow Chemical Co., Ltd.), "STAMILEX" (trade name, DSM), "SUCLEAR" (trade name, DuPont de Nemour, Canada), "MARLEX" (trade name, Phillips Co., Ltd.), "ULTZEX" and "NEOZEX" (trade names, Mitsui Petroleum Chemical Industries Co., Ltd.), "NISSEKI LINIREX" (trade name, Nippon Petrochemicals Co., Ltd.), "IDEMITSU POLYETHYLENE-L" (Idemitsu Petrochemical Co., Ltd.) and "NUC POLYETHYLENE-LL" (trade name, Nippon Unicar Co., Ltd.).

The content of the L-LDPE is 9.8 to 49.8 wt. %. When the content is less than the above range, the dropping strength is not so improved, and warp becomes large. While, when the content is beyond the above range, stringiness and gate marks occur. Moreover, the compressive strength decreases, and deformation is liable to occur.

Various additives may be added to the resin composing the tray. Examples of the additives are described below.

(1) Plasticizer; phthalic acid ester, glycol ester, fatty acid ester, phosphoric acid ester, etc.

(2) Stabilizer; lead compounds, cadmium comounds, zinc compounds, alkaline earth metal compounds, organic tin compounds, etc.

(3) Antistatic agent; cation surfactants, anion surfactants, nonion surfactants, ampholytic surfactants, etc.

(4) Flame retardant; phosphoric acid ester, phosphoric acid ester halides, halides, inorganic materials polyols containing phosphor, etc.

(5) Filler; alumina, kaolin, clay, calcium carbonate, mica, talc, titanium dioxide, silica, etc.

(6) Reinforcing agent; glass lobing, metallic fiber, glass fiber, glass milled fiber, carbon fiber, etc.

(7) Coloring agent; inorganic pigments (A1, $Fe_2O_3$, $TiO_2$, ZnO, CdS, etc.), organic pigments, dyes, etc. Some of them are also usable as light-shielding materials (8) Blowing agent; inorganic blowing agents (ammonium carbonate, sodium hydrogen carbonate), organic blowing agents (nitroso compounds, azo compounds) etc.

(9) Vulcanizing agent; vulcanization accelerator, acceleration assistant, etc.

(10) Deterioration preventing agent; ultraviolet absorber, antioxidant, metal deactivator, peroxide decomposing agent, etc.

(11) Coupling agent; silane compounds, titanium comounds, chromium compounds, aluminum compounds, etc.

(12) Lubricant; higher fatty acid lubricants, silicone lubricants, metallic soaps, aliphatic hydrocarbon lubricants, fatty acid amide lubricants, etc.

The light-shielding tray is usually produced by injection molding. The molding method is not limited, and the tray may, for example, be produced by inter mold vacuum injection molding. Stack molding is preferable in view of efficient production.

In the light-shielding tray of the invention, rigidity is secured by the propylene-α-olefin copolymer resin, and troubles caused by this copolymer resin such as mold shrinkage, warp and twist of the product are overcome and remarkable lowering of physical strength by blending carbon black are attained by incorporating the L-LDPE resin. Accordingly, even when this tray is made thin, sufficient rigidity and physical strength can be secured, although the tray is large. Since deformation is small, sealability between the light-shielding flexible cover sheet is acceptable. Moldability of the resin composing the tray is also sufficient.

The use of the packaging case of the invention is not limited for X-ray photographic films for image output laser printer, and for example, it can be used as the magazine for packaging photographic sheet films for printing capable of being loaded in light room.

EXAMPLES

The tray of Example 1 was composed of 80 wt. % of ethylene-propylene random copolymer resin, 18.5 wt. % of L-LDPE resin and 1.5 wt. % of carbon black. The ethylene content of the above copolymer resin was 3.5 wt. %, and the MI of this resin was 40 g/10 minutes. The bending elastic modulus of the resin was 14,000 $kg/cm^2$, and the notched Izod impact strength was 5.0 kg cm/cm at 23° C. This copoymer resin was blended with 0.2 wt. % of 1,3,2,4-dibenzylidenesorbitol and 0.3 wt. % of oleic acid amide. The carbon black was oil furnace carbon black "#44B" (manufactured by MITSUBISHI CHEMICAL INDUSTRIES LTD.), and the L-LDPE resin was a copolymer of ethylene and 4-methylpentene-1 "ULTZEX #20100J" (manufactured by MITSUI PETROCHEMICAL INDUSTRIES CO., LTD.).

The tray of Example 2 was the same as Example 1, except that "ULTZEX #20200J" (manufactured by MITSUI PETROCHEMICAL INDUSTRIES CO., LTD.) was employed as the L-LDPE resin instead of "ULTZEX #20100J".

The tray of Example 3 was the same as Example 1, except that "ULTZEX #30100J" (manufactured by MITSUI PETROCHEMICAL INDUSTRIES CO., LTD.) was employed as the L-LDPE resin instead of "ULTZEX #20100J".

The tray of Example 4 was the same as Example 1, except that "ULTZEX #30200J" (manufactured by MITSUI PETROCHEMICAL INDUSTRIES CO., LTD.) was employed as the L-LDPE resin instead of "ULTZEX #20100J".

The tray of Example 5 was the same as Example 1, except that "ULTZEX #25100J" (manufactured by MITSUI PETROCHEMICAL INDUSTRIES CO., LTD.) was employed as the L-LDPE resin instead of "ULTZEX #20100J".

Comparative tray 1 was composed of 98.5 wt. % of the propylene-ethylene random copolymer resin of Example 1 and 1.5 wt. % of the carbon black of Example 1.

Comparative tray 2 was composed of 98.5 wt. % of ethylene-propylene random copolymer resin and 1.5 wt. % of carbon black. The MI of the copolymer resin was 12.3 g/10 minutes, the bending elastic modulus of this resin was 9,800 $kg/cm^2$, and the notched Izod impact strength was 3.5 kg cm/cm. The carbon black was the same as Example 1.

Comparative tray 3 was composed of 98.5 wt. % of high-impact polystyrene resin containing 6 wt. % of rubber and 1.5 wt. % of the same carbon black as Example 1. The MI of the above polystyrene resin was 18 g/10 minutes.

Comparative tray 4 was composed of 98.5 wt. % of ABS resin having a MI of 11 g/10 minutes and 1.5 wt. % of the same carbon black as Example 1.

Various properties of these trays were measured and shown in Table 1.

TABLE 1

| | Invention | | | | | Comparative | | | |
|---|---|---|---|---|---|---|---|---|---|
| | 1 | 2 | 3 | 4 | 5 | 1 | 2 | 3 | 4 |
| Generation of Warp | B | B | B | B | B | B | E | C | E |
| (mm) | 0–1 | 0–1 | 0–1 | 0–1 | 0–1 | 0–1 | 8 | 5 | 10 |
| Ratio of Short Shot Generation | B | B | B | B | B | B | D | C | E |
| Ratio of Crack Generation from Horizontal State | A | A | A | A | A | E | E | E | Unmeasurable because of short shot Generation |
| From 50 cm (%) | 0 | 0 | 0 | 0 | 0 | 80 | 90 | 100 | |
| Ratio of Crack Generation from Horizontal State | A | A | A | A | A | E | E | E | |
| From 1 m (%) | 0 | 0 | 0 | 0 | 0 | 90 | 100 | 100 | |
| Ratio of Crack Generation from Oblique State | A | C | B | C | B | E | E | E | |
| From 50 cm (%) | 0 | 30 | 10 | 30 | 10 | 90 | 100 | 100 | |
| Sealability between Cover Sheet | B | B | B | B | B | D | D | B | |

Evaluations in Table 1 were carried out as follows:
A very excellent
B excellent
C practical
D having a problem
E impractical Testing methods were as follows:

Generation of Warp

Three corners of each exemplified light-shielding tray was fixed on a flat table, and the distance between the remaining corner and surface of the table was measured.

Ratio of Short Shot Generation

The number of short shot products per one hundred products.

Ratio of Crack Generation from Horizontal State

The flange of each exemplified tray was turned up and kept horizontal. It was dropped to a concrete floor at a room temperature of 20° C. from 50 cm or 1 m height, and the number of cracked trays per 100 trays was indicated in Table 1.

Ratio of Crack Generation from Oblique State

The flange of each exemplified tray was turned up, and it was inclined at 45 degrees so that one corner was located in the lowest position. Then, it was dropped to concrete floor from 50 cm height, and judged by the number of cracked trays.

Sealability between Cover Sheet

The light-shielding flexible cover sheet employed was composed of 12 μm in thickness of biaxially sretched polyester film, 7 μm in thickness of aluminum foil laminated thereunder through 15 μm in thickness of LDPE resin adhesive layer and light-shielding ethylene-ethylacrylate (EEA) resin extrusion laminate layer applied thereunder directly. The ethylacrylate comonomer content of the EEA resin was 18 wt. %, and 4.5 wt. % of carbon black was blended.

This cover sheet was attached to each exemplified tray by heat sealing at 180° C. at a sealing pressure of 1 kg/cm$^2$ for 2 seconds, and this property was judged by its peeling resistance.

We claim:

1. In a packaging case for photosensitive sheet film comprising a light-shielding tray which receives a stack of said photosensitive sheet film and a light-shielding flexible cover sheet which is stuck in peelable state to seal the opening for taking out said stack, the improvement comprising that said tray is made of resin comprising 50 to 90 wt. % of a propylene-α-olefin copolymer resin containing at least 0.1 wt. % of said α-olefin and having a melt index of higher than 18 g/10 minutes, a bending elastic modulus of more than 9,000 kg/cm$^2$ and a notched Izod impact strength of more than 2.0 kg cm/cm at 23° C., 0.2 to 0.5 wt. % of carbon black and 9.8 to 49.8 wt. % of linear low density polyethylene resin.

2. The packaging case of claim 1 wherein said propylene-α-olefin copolymer resin is propylene-ethylene random copolymer resin.

3. The packaging case of claim 1 or claim 2 wherein the content of said α-olefin in said copolymer resin is 0.1 to 10 wt. %.

4. The packaging case of claim 1 wherein said propylene-α-olefin copolymer resin is blended with 0.1 to 2.0 wt. % of a nucleating agent.

5. The packaging case of claim 1 wherein the melt index of said linear low density polyethylene resin 5 to 30 g/10 minutes at 190° C.

6. The packaging case of claim 1 wherein said photosensitive sheet films are X-ray photographic films.

* * * * *